(12) United States Patent
Park et al.

(10) Patent No.: US 7,623,588 B2
(45) Date of Patent: Nov. 24, 2009

(54) TRANSMISSION METHOD FOR OFDM-MIMO COMMUNICATION SYSTEM

(75) Inventors: Chang-Soon Park, Ghungju-si (KR); Kwang-Bok Lee, Seoul (KR); Seung-Hoon Nam, Seoul (KR); Koo-Chul Jung, Seoul (KR)

(73) Assignees: Samsung Electronics Co., Ltd (KR); Seoul National University Industry Foundation (KR)

( * ) Notice: Subject to any disclaimer, the term of this patent is extended or adjusted under 35 U.S.C. 154(b) by 547 days.

(21) Appl. No.: 11/235,395

(22) Filed: Sep. 26, 2005

(65) Prior Publication Data
US 2006/0067417 A1  Mar. 30, 2006

Related U.S. Application Data

(60) Provisional application No. 60/612,807, filed on Sep. 24, 2004.

(30) Foreign Application Priority Data
Sep. 22, 2005  (KR) ...................... 10-2005-0088173

(51) Int. Cl.
H04B 7/02 (2006.01)
H04L 1/02 (2006.01)
(52) U.S. Cl. ...................................... 375/267; 455/522
(58) Field of Classification Search ................ 375/229, 375/260, 267; 455/522
See application file for complete search history.

(56) References Cited

U.S. PATENT DOCUMENTS

| 4,731,816 A | * | 3/1988 | Hughes-Hartogs ....... 379/93.31 |
| 2003/0235147 A1 | | 12/2003 | Walton et al. |
| 2004/0132496 A1 | * | 7/2004 | Kim et al. ................. 455/562.1 |
| 2004/0146018 A1 | | 7/2004 | Walton et al. |
| 2005/0099975 A1 | * | 5/2005 | Catreux et al. ............... 370/329 |

FOREIGN PATENT DOCUMENTS

| KR | 1020040085680 | 10/2004 |
| WO | WO 03/085876 | 10/2003 |

OTHER PUBLICATIONS

Jung et al, Bit and Power Allocation for MIMO-OFDM Systems with Spatial Mode Selection over Frequency-Space-Time-Selective Channels, Sep. 26-29, 2004, IEEE, pp. 3404-3408.*

* cited by examiner

Primary Examiner—Chieh M. Fan
Assistant Examiner—Freshteh N Aghdam
(74) Attorney, Agent, or Firm—The Farrell Law Firm, LLP

(57) ABSTRACT

A data transmission method in a MIMO-OFDM communication system including at least one receiver for receiving a signal through a plurality of reception antennas and a transmitter for selecting a transmission channel using channel information being fed back from the receiver and transmitting a signal through a plurality of transmission antennas. The method includes selecting a spatial subchannel in which when bits are added by applying at least two spatial modes having different multiplexing gains for an individual subcarrier in a frequency domain, the minimum power increment is required during application of each spatial mode; allocating a spatial mode that requires the minimum total accumulated power, for each subcarrier; and selecting all subcarriers in the order of a subcarrier that requires the minimum power increment.

6 Claims, 18 Drawing Sheets

G=3

G=4

TRANSMISSION METHOD FOR OFDM-MIMO COMMUNICATION SYSTEM

PRIORITY

This application claims priority under 35 U.S.C. § 119 to an application entitled "Transmission Method for OFDM-MIMO Communication System" filed in the United States Patent and Trademark Office on Sep. 24, 2004 and assigned Ser. No. 60/612,807, and an application entitled "Transmission Method for OFDM-MIMO Communication System" filed in the Korean Intellectual Property Office on Sep. 22, 2005 and assigned Ser. No. 2005-88173, the contents of both of which are incorporated herein by reference.

BACKGROUND OF THE INVENTION

1. Field of the Invention

The present invention relates generally to an Orthogonal Frequency Division Multiplexing (OFDM)-based Multiple-Input Multiple-Output (MIMO) wireless communication system, and in particular, to a data transmission control method for an OFDM-MIMO wireless communication system.

2. Description of the Related Art

A MIMO technique, which is technology for transmitting/receiving data using a plurality of transmission antennas and a plurality of reception antennas, can contribute to an epochal improvement in system capacity owing to a plurality of independent spatial channels formed by the plurality of transmission/reception antennas. For these reasons, the MIMO technique is well known as a transmission technique suitable for the next generation wireless communication in which high-speed high-capacity data transmission is required. It is well known that in a rich scattering wireless channel environment, approximate capacity of a MIMO Rayleigh fading channel linearly increases with the smaller one among a number of transmission antennas and a number of reception antennas.

OFDM is a transmission scheme for dividing one broadband channel into a plurality of narrowband channels, allocating orthogonal frequencies to the channels, and transmitting different data on the channels. Thus, the OFDM scheme is suitable for high-speed data transmission. In the OFDM scheme, because symbol duration of each subcarrier increases with the number of subcarriers, it is possible to efficiently reduce inter-symbol interference and simply implement the structure of a receiver. Therefore, it is expected that a MIMO-OFDM system, implemented by combining a MIMO system with the OFDM scheme, will become a standard for the next generation wireless communication system.

The latest research into the MIMO system has mainly focused on maximizing a multiplexing gain or a diversity gain. However, because the optimal multiplexing gain or diversity gain can be subject to change according to the given channel environment, application of a fixed MIMO technique in a time-varying environment does not always guarantee efficient channel utilization.

The existing research on the OFDM system shows that it is possible to improve system performance by appropriately adjusting a bit rate and transmission power at a transmitter. However, this technique is limited only to the OFDM system, and adjusts transmission parameters not in a spatial domain but in a frequency domain.

An adaptive modulation and MIMO coding technique has been proposed as a link adaptation (LA) technique for the MIMO-OFDM system. The adaptive modulation and MIMO coding technique improves channel efficiency by changing transmission parameters, such as a modulation scheme and a coding rate, according to time-varying channel conditions. However, the adaptive modulation and MIMO coding technique has a limitation in that the same transmission parameters are applied in the spatial domain and the frequency domain, and is limited in performance improvement because the same transmission power is allocated to all of the sub-channels.

SUMMARY OF THE INVENTION

An object of the present invention is to substantially solve at least the above problems and/or disadvantages and to provide at least the advantages below. It is, therefore, an object of the present invention to provide a data transmission method capable of maximizing system throughput by appropriately adjusting not only a bit rate and transmission power but also a spatial mode according to channel conditions.

According to one aspect of the present invention, there is provided a data transmission method in a MIMO-OFDM (Multiple Input Multiple Output-based Orthogonal Frequency Division Multiplexing) communication system including at least one receiver for receiving a signal through a plurality of reception antennas and a transmitter for selecting a transmission channel using channel information being fed back from the receiver and transmitting a signal through a plurality of transmission antennas. The method includes selecting a spatial subchannel in which when bits are added by applying at least two spatial modes having different multiplexing gains for an individual subcarrier in a frequency domain, a minimum power increment is required during application of each spatial mode; allocating a spatial mode that requires the minimum total accumulated power, for each subcarrier; and selecting all subcarriers in the order of a subcarrier that requires the minimum power increment.

According to another aspect of the present invention, there is provided a data transmission method in a MIMO-OFDM (Multiple Input Multiple Output-based Orthogonal Frequency Division Multiplexing) communication system including at least one receiver for receiving a signal through a plurality of reception antennas and a transmitter for selecting a transmission channel using channel information being fed back from the receiver and transmitting a signal through a plurality of transmission antennas. The method includes grouping consecutive subcarriers in a frequency domain into a predetermined number of subcarrier groups; selecting a representative subcarrier from each subcarrier group; selecting a spatial mode having the highest throughput for each of the selected subcarriers; and allocating the selected spatial mode to all subcarriers in the corresponding subcarrier group.

According to further another aspect of the present invention, there is provided a data transmission method in a MIMO-OFDM (Multiple Input Multiple Output-based Orthogonal Frequency Division Multiplexing) communication system including at least one receiver for receiving a signal through a plurality of reception antennas and a transmitter for selecting a transmission channel using channel information being fed back from the receiver and transmitting a signal through a plurality of transmission antennas. The method includes selecting a predetermined number of subcarriers in a frequency domain; calculating a signal-to-noise ratio (SNR) for each subcarrier-spatial mode by applying at least two spatial modes having different multiplexing gains for the selected subcarriers; determining a data rate corresponding to an SNR of each subcarrier-spatial mode using a mapping table; calculating a sum of data rates for the subcarriers when the same spatial modes are applied; selecting a spatial mode having the maximum data rate sum by comparing data rate sums between spatial modes; and allocating the selected spatial mode to all subcarriers.

According to yet another aspect of the present invention, there is provided a data transmission method in a MIMO-OFDM (Multiple Input Multiple Output-based Orthogonal Frequency Division Multiplexing) communication system including at least one receiver for receiving a signal through a plurality of reception antennas and a transmitter for selecting a transmission channel using channel information being fed back from the receiver and transmitting a signal through a plurality of transmission antennas. The method includes calculating data rates for all subcarriers when the subcarriers are applied to two spatial modes having different multiplexing gains; calculating an average data rate of a first spatial mode having a lesser multiplexing gain out of the two spatial modes; determining whether the average data rate of the first spatial mode is lower than a saturated data rate; allocating the first spatial mode for all subcarriers if the average data rate of the first spatial mode is lower than a saturated data rate; and allocating a second spatial mode being greater than the first spatial mode in multiplexing gain, for all of the subcarriers if the average data rate of the first spatial mode is greater than or equal to the saturated data rate.

According to still another aspect of the present invention, there is provided a data transmission method in a MIMO-OFDM (Multiple Input Multiple Output-based Orthogonal Frequency Division Multiplexing) communication system including at least one receiver for receiving a signal through a plurality of reception antennas and a transmitter for selecting a transmission channel using channel information being fed back from the receiver and transmitting a signal through a plurality of transmission antennas. The method includes selecting a predetermined number of subcarriers in a frequency domain; calculating the total throughput for the selected subcarriers when a spatial mode with a multiplexing gain of 1 and a spatial mode with a multiplexing gain of 2 are applied; determining whether a first condition that the spatial mode with the multiplexing gain of 2 is greater than or equal to the spatial mode with the multiplexing gain of 1 in terms of the total throughput is satisfied; allocating the spatial mode with the multiplexing gain of 1 for all subcarriers if the first condition is not satisfied; if the first condition is satisfied, determining whether a second condition that an average data rate of the spatial mode with the multiplexing gain of 2 is greater than or equal to a saturated data rate is satisfied; allocating the spatial mode with the multiplexing gain of 2 for all subcarriers if the second condition is not satisfied; and allocating a spatial mode with a multiplexing gain of 4 for all subcarriers if the second condition is satisfied.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A data transmission method in a MIMO-OFDM system according to an embodiment of the present invention will now be described in detail with reference to the annexed drawings.

Figure 1:
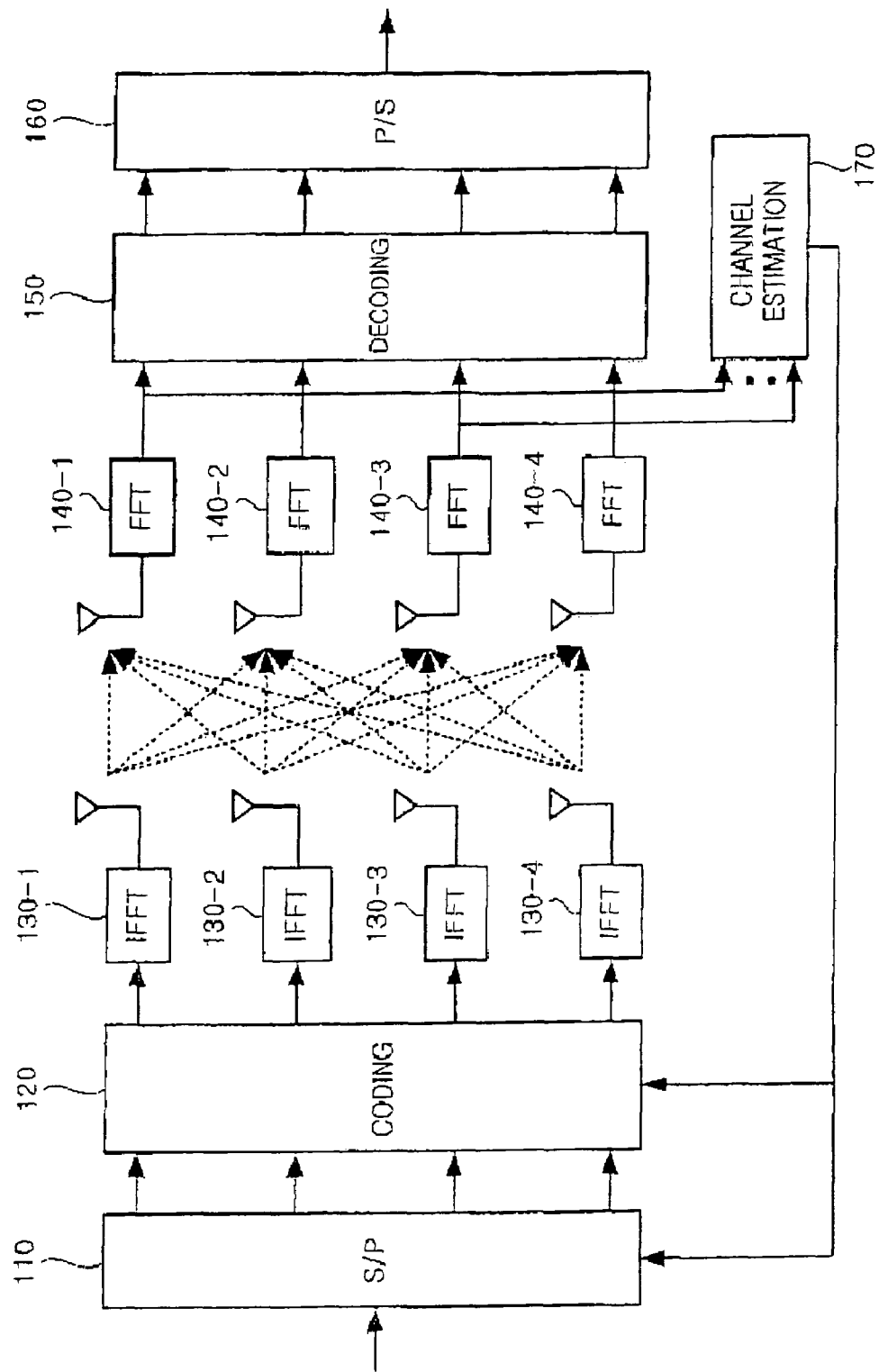
FIG. 1 is a block diagram illustrating a configuration of a MIMO-OFDM system to which the data transmission method of the present invention is to be applied.
Figure 2A:
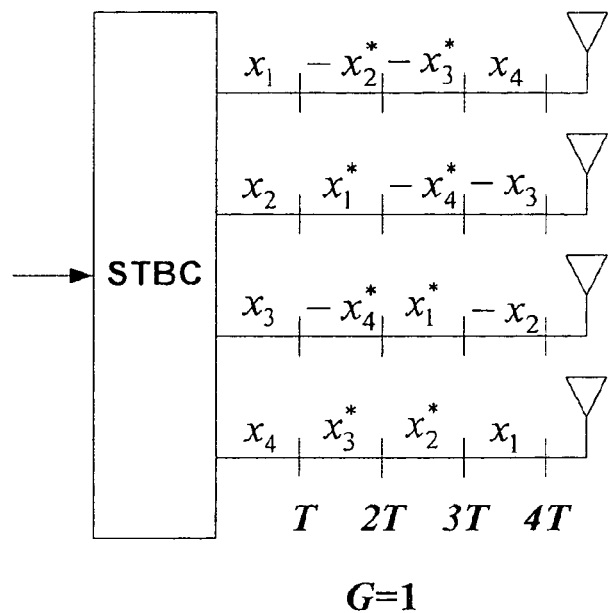
FIGS. 2A to 2D are conceptual diagrams for a description of spatial modes to be applied to the data transmission method of the present invention
Figure 2B:
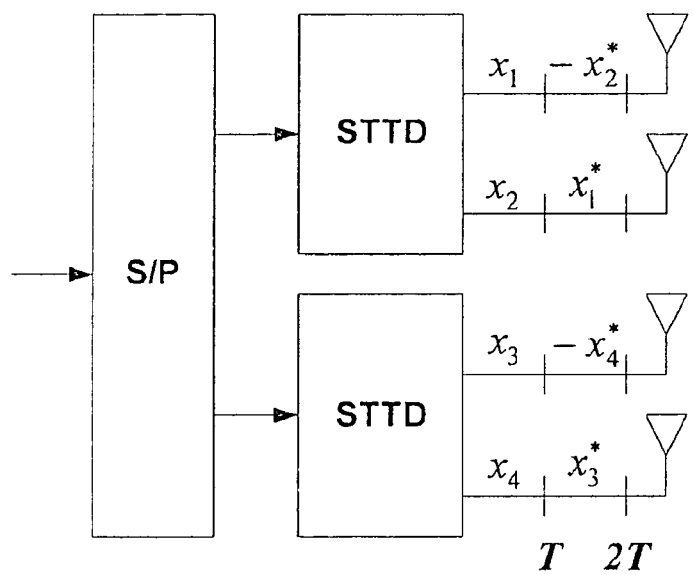
Figure 2C:
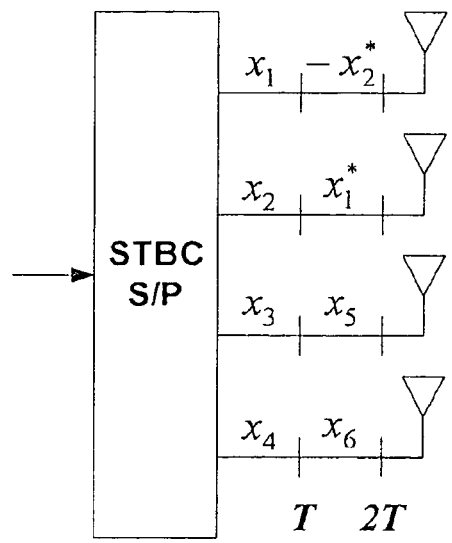
Figure 2D:
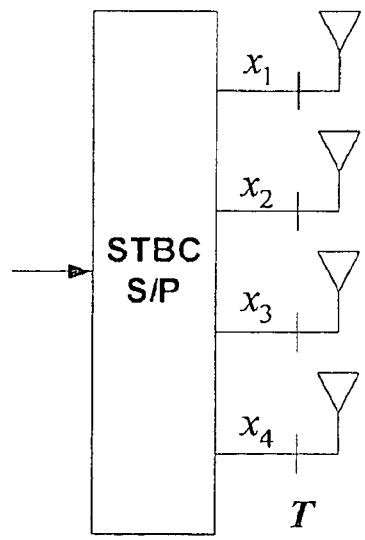

As illustrated in FIG. 1, the novel MIMO-OFDM system is comprised of a transmitter and a receiver. The transmitter includes a serial-to-parallel (S/P) converter 110 for converting an input bit stream into a plurality of parallel bit streams, a coding unit 120 for performing modulation, power allocation and spatial-coding on the parallel bit streams output from the S/P converter 110 and outputting parallel transmission symbols, and inverse fast Fourier transform (IFFT) units 130-1 through 130-4 for performing IFFT on the parallel transmission symbols output from the coding unit 120 and transmitting the IFFT-processed transmission symbols via their corresponding transmission antennas. The receiver includes a plurality of fast Fourier transform (FFT) units 140-1 through 140-4 for performing FFT on the signals received through their corresponding reception antennas, a decoding unit 150 for performing spatial decoding and demodulation on the signals received from the FFT units 140-1 through 140-4, a parallel-to-serial (P/S) converter 160 for performing P/S conversion on the parallel signal streams output from the decoding unit 150 and outputting a transmission bit stream, and a channel estimator 170 for estimating channels using the signal values output from the FFT units 140-1 through 140-4, calculating a spatial mode, a modulation scheme and transmission power for each channel, and feeding back the calculated information to the transmitter.

Herein, the number of transmission antennas is denoted by $M_t$, the number of reception antennas is denoted by $M_r$, and the number of subcarriers is denoted by N. In addition, the number of independent data streams that can be transmitted for one symbol duration in a given spatial mode is defined as a multiplexing gain G ($\leq M_t$).

If a spatial mode with a multiplexing gain G is used, signals are transmitted through G spatial substreams at each frequency. Therefore, the total number of signal substreams transmitted through spatial and frequency domains at a particular time becomes GN.

FIGS. 2A to 2D are conceptual diagrams for a description of spatial modes to be applied to the novel data transmission method, and show Space Time Block Code (STBC), Dual Space-Time Transmit Diversity (D-STTD), hybrid STTD, and full multiplexing, respectively. As shown in FIGS. 2A to 2D, it can be noted that a multiplexing gain of an STBC mode 1, a multiplexing gain of a D-STTD mode is 2, a multiplexing gain of a hybrid STTD mode is 3, and a multiplexing gain of a full multiplexing mode is 4.

Although the foregoing four MIMO techniques are used as spatial modes herein, the present invention is not so limited and can also be applied to other known MIMO techniques. Detailed transmission/reception techniques for the spatial modes corresponding to the multiplexing gains G are well known, and a description thereof will be omitted herein.

Herein, the total transmission power used by all spatial substreams is limited to a particular value. In addition, a receiver has a look-up table (LUT) shown in Table 1 in order to satisfy a particular performance condition that must be satisfied by each substream, for example, the condition that each substream should have a bit error rate (BER) which is lower than a particular BER.

TABLE 1

| SNR | Modulation Scheme | Number of Bits |
| --- | --- | --- |
| 0~$SNR_1$ | No Tx | 0 |
| $SNR_1$~$SNR_2$ | BPSK | 1 |
| $SNR_2$~$SNR_3$ | QPSK | 2 |
| $SNR_3$~$SNR_4$ | 8QAM | 3 |
| $SNR_4$~$SNR_5$ | 16QAM | 4 |
| $SNR_5$~$SNR_6$ | 32QAM | 5 |
| $SNR_6$~ | 64QAM | 6 |

Table 1 shows signal-to-noise ratios (SNRs) and modulation schemes required to satisfy a target BER. As shown in Table 1, a modulation scheme is determined according to a range of an SNR for each channel. For example, if an SNR of one subcarrier falls within a range of $SNR_1$~$SNR_2$, Binary Phase Shift Keying (BPSK) is selected as a modulation scheme and the number of transmission bits becomes 1. In addition, if the SNR falls within a range of $SNR_5$~$SNR_6$, 32-ary Quadrature Amplitude Modulation (32QAM) is selected as a modulation scheme and the number of transmission bits becomes 5.

A data transmission method according to an embodiment of the present invention will now be described with reference to the accompanying drawing.

Figure 3:
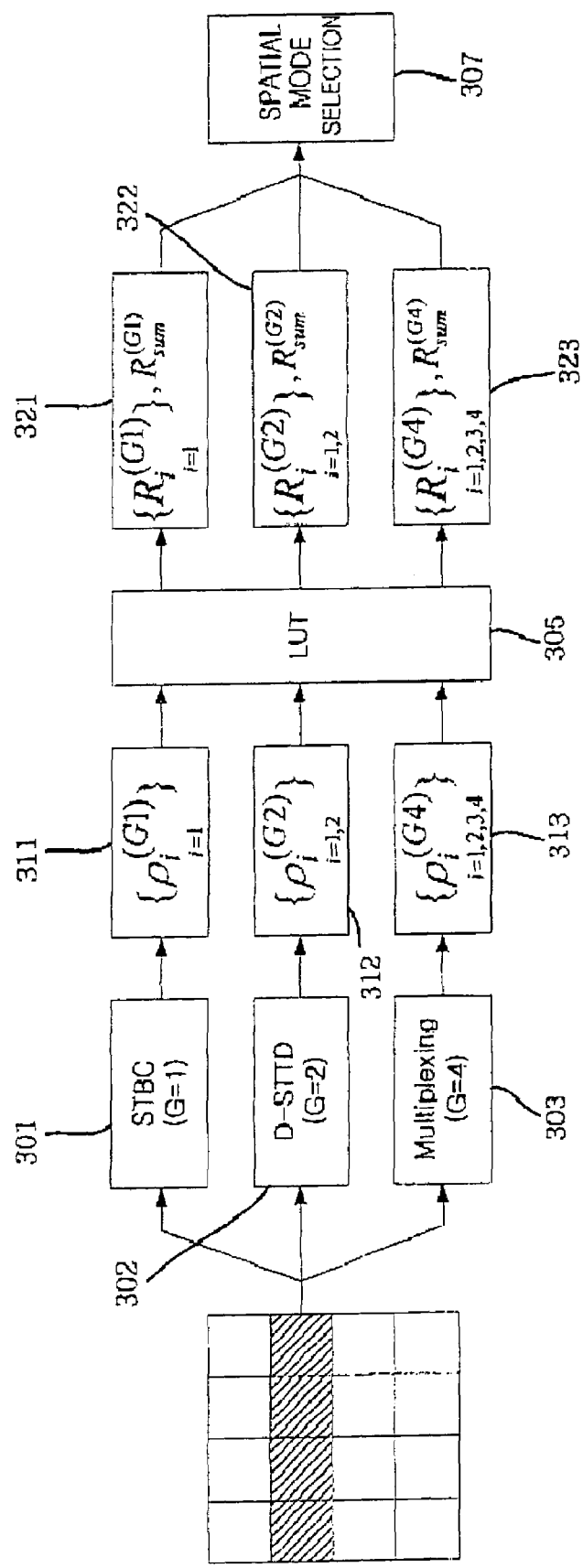
FIG. 3 is a conceptual diagram for a description of a data transmission method according to a first embodiment of the present invention.

FIG. 3 is a conceptual diagram for a description of a data transmission method according to an embodiment of the present invention. For convenience, this embodiment employs STBC 301 with G=1, D-STTD 302 with G=2, and full multiplexing 303 with G=4 as a selectable spatial mode.

First, the channel estimator 170 of FIG. 1 selects a spatial subchannel in which a minimum power increment is required when bits are added for the three spatial modes for each subcarrier.

In other words, for one subcarrier, in the case of the STBC mode having one SNR value as in a first SNR block 311, the channel estimator 170 selects a spatial subchannel according thereto. In the case of the D-STTD mode having two SNR values 312 as in a second SNR block 312, the channel estimator 170 selects a spatial subchannel corresponding to one of the two SNR values, which requires the minimum power increment. In the case of the full multiplexing mode having four SNR values as in a third SNR block 313, the channel estimator 170 selects a spatial subchannel corresponding to one of the four SNR values, which requires the minimum power increment.

When the spatial subchannel that requires the minimum power increment in each spatial mode is selected for each subcarrier, the channel estimator 170 selects a modulation scheme for each spatial mode through the look-up table 305 shown in Table 1, calculates all data rates, as in the calculation blocks 321, 322, and 323, for each spatial mode for the case where the selected modulation scheme is applied, compares the calculated data rates, and selects a spatial mode having the highest data rate as an optimal spatial mode in a mode selection block 307.

When the optimal spatial modes are selected for all of the subcarriers, the channel estimator 170 selects a subcarrier that requires the minimum power increment among the subcarriers.

The channel estimator 170 repeats the foregoing processes until the given total transmission power is fully allocated.

A detailed algorithm of a data transmission method according to a first embodiment of the present invention is as follows.

1) Initial bits for all of subcarriers k (k=1, 2, ..., N), spatial substreams j (j=1, 2, ..., G), and a multiplexing gain G ($\leq M_t$) are set to $b_{j,k}^G=0$, and initial power for all of the subcarriers k (k=1, 2, ..., N) and the multiplexing gain G is set to $P_k^G=0$.

2) Noise variances $\eta_{j,k}^{(G)}$ for all of the subcarriers k (k=1, 2, ..., N), the spatial substreams j (j=1, 2, ..., G), and the multiplexing gain G are calculated.

3) A power increment $\Delta P_{j,k}^{(G)}$ required to transmit one more bit is calculated by Equation (1).

$$\Delta P_{j,k}^{(G)} = (SNR_{b_{j,k}^{(G)}+1} - SNR_{b_{j,k}^{(G)}})\eta_{j,k}^{(G)} + P_k^{(G)} - P_k^{g_k} \quad (1)$$

Herein, $g_k$ denotes a multiplexing gain for a $k^{th}$ subcarrier selected at a previous iteration. Step 3) is performed on all of the subcarriers, the spatial modes, and the spatial subchannels.

4) Spatial subchannel indexes $j_k^{(G)}$ for the subcarriers k and the multiplexing gain G are selected according to Equation (2).

$$j_k^{(G)} = \arg\min_{j}(\Delta P_{j,k}^{(G)}) \quad (2)$$

Step 4) is performed on all of the subcarriers and the spatial modes.

5) One spatial mode is selected from each subcarrier in accordance with Equation (3).

$$G_k = \arg\min_{G} \Delta P_{j_k^{(G)},k}^{(G)} \quad (3)$$

Step 5) is performed on all of the subcarriers.

6) A subcarrier in which one more bit can be allocated with the minimum required power is selected by Equation (4).

$$k' = \arg\min_{k} \Delta P_{j_k^{(G_k)},k}^{(G_k)} \quad (4)$$

7) A bit for a $j_k^{(G_{k'})th}$ spatial subchannel, and power corresponding to a $k'^{th}$ subcarrier and a multiplexing gain $G_{k'}$ are updated by Equation (5) and Equation (6), respectively.

$$b^{(G_{k'})}_{j^{(G_{k'})}_{k'},k'} = b^{(G_{k'})}_{j^{(G_{k'})}_{k'},k'} + 1 \quad (5)$$

$$P^{(G_{k'})}_{k'} = P^{(g_{k'})}_{k'} + \Delta P^{(G_{k'})}_{j^{(G_{k'})}_{k'},k'} \quad (6)$$

8) To prepare for the case where the spatial mode changes later, bits and power for other spatial modes for the selected subcarrier k' are reserved by Equation (7) and Equation (8), respectively.

$$b^{(G)}_{j^{(G)}_{k'},k'} = b^{(G)}_{j^{(G)}_{k'},k'} + 1, G \neq G_{k'} \quad (7)$$

$$P^{(G)}_{k'} = P^{(g_{k'})}_{k'} + \Delta P^{(G)}_{j^{(G)}_{k'},k'}, G \neq G_{k'} \quad (8)$$

In addition, an index $g_{k'}$ is updated by Equation (9)

$$g_{k'} = G_{k'} \quad (9)$$

9) Step 3) through Step 8) are repeated until the given total transmission power is fully allocated, and thereafter, a bit, power, and a spatial mode for transmission are determined.

Figure 4A:
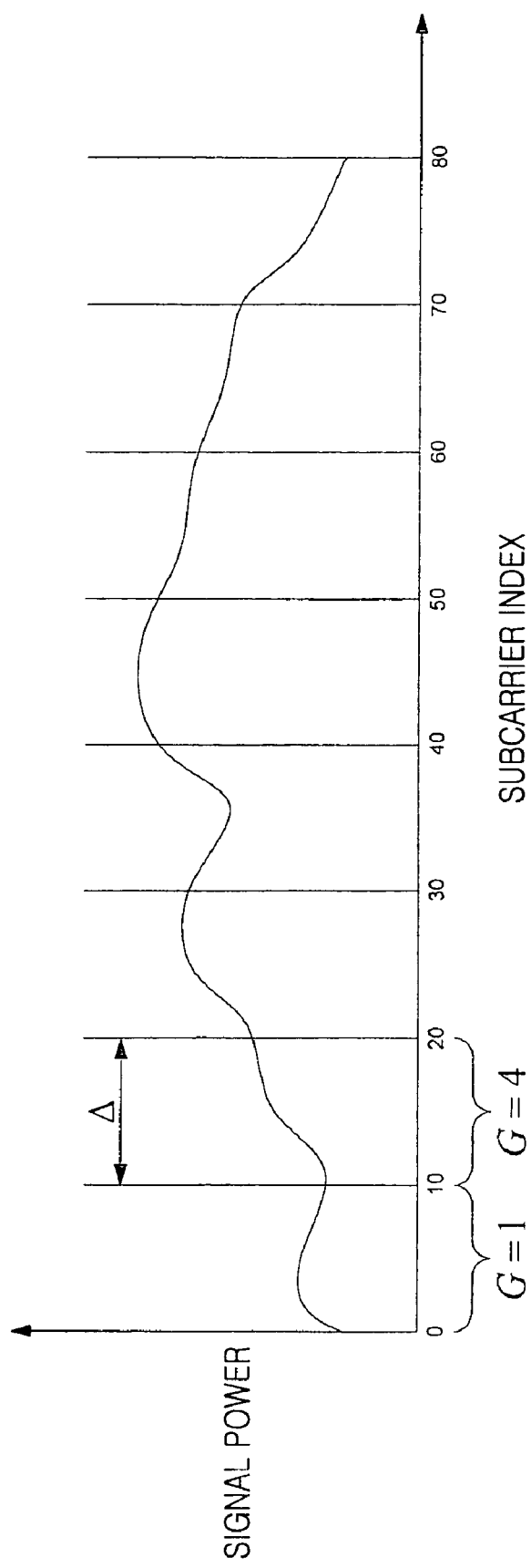
FIGS. 4A and 4B are resource graphs for a description of a data transmission method according to a second embodiment of the present invention.
Figure 4B:
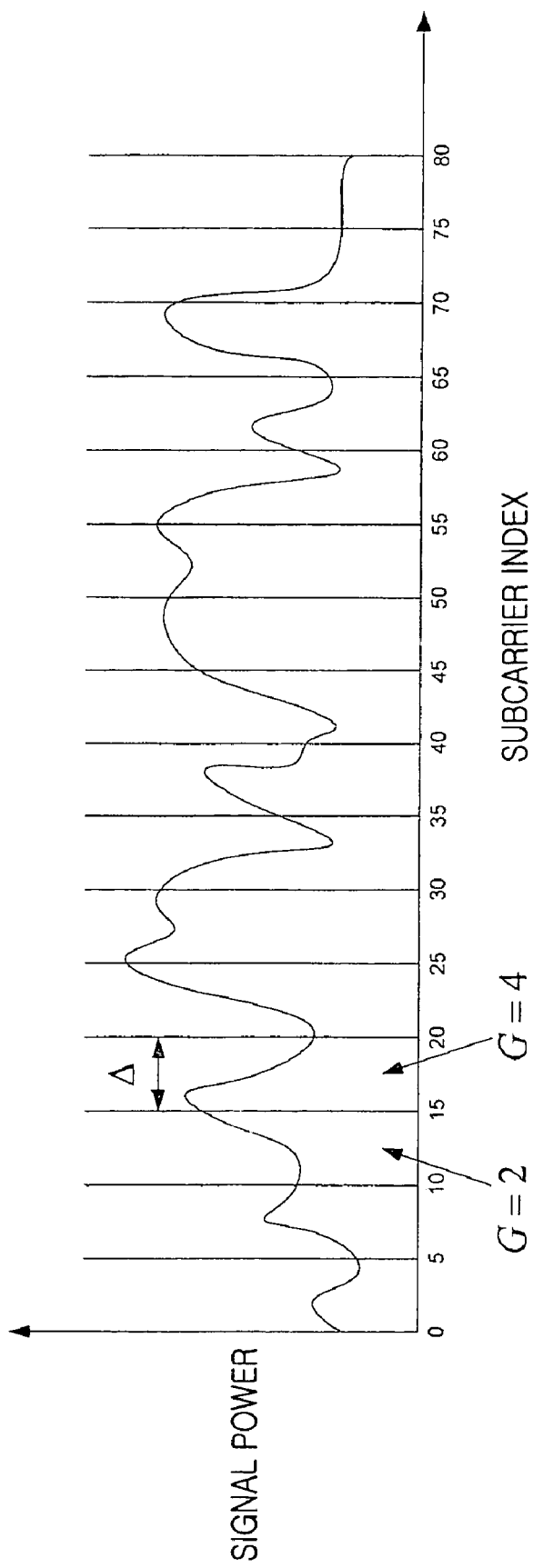

FIGS. 4A and 4B are resource graphs for a description of a data transmission method according to another embodiment of the present invention. That is, a second embodiment of the present invention selects a spatial mode using a correlation between consecutive subcarriers in the frequency domain.

As shown in FIG. 4A, the second embodiment of the present invention groups subcarriers by the predetermined number of subcarriers in the frequency domain, and selects a spatial mode for the center subcarrier in each subcarrier group. This is based on the assumption that adjacent subcarriers are subject to less change, and the second embodiment groups the subcarriers, selects a representative spatial mode for one of the subcarriers in each subcarrier group, and applies the same spatial mode to the adjacent subcarriers in the same group, thereby contributing to a reduction in calculation complexity. It is preferable that the number of subcarriers constituting a group is set large at the initial stage in order to reduce calculation complexity. Once spatial modes are selected for all groups, multiplexing gains G of spatial modes between adjacent groups are compared.

If a difference between the multiplexing gains of two spatial modes is large as a result of the comparison, this embodiment decreases the number of subcarriers constituting one group and reselects the spatial modes of the groups. The reason for reducing the number of subcarriers constituting one group is to allow the spatial mode to change step by step.

For example, in FIG. 4A, if the number of subcarriers constituting one group is $\Delta=10$ and multiplexing gains of spatial modes selected for two adjacent groups are 1 and 4, respectively, this embodiment can relieve a change in the multiplexing gain between groups by reducing the number of subcarriers for one group to 5 as shown in FIG. 4B.

Figure 5:
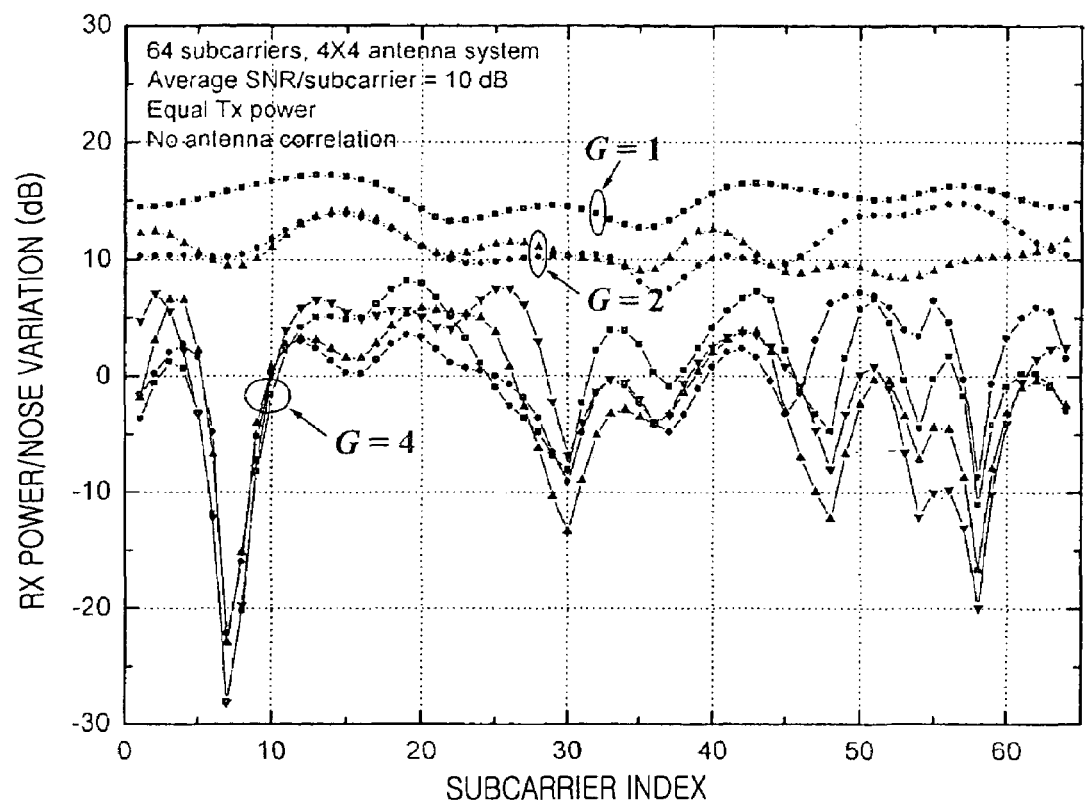
FIG. 5 is a graph illustrating SNR characteristics of each subchannel for spatial modes in the data transmission method of the present invention.

FIG. 5 is a resource graph for a description of a data transmission method according to further another embodiment of the present invention. That is, a third embodiment of the present invention uses SNR characteristics in the frequency domain for the spatial mode. As shown in FIG. 5, it can be noted that when a transmitter transmits data in a spatial mode with G=1 or G=2, a variation in received SNR is less and a variation in SNR of each spatial channel is large for the spatial mode with G=4.

Figure 6:
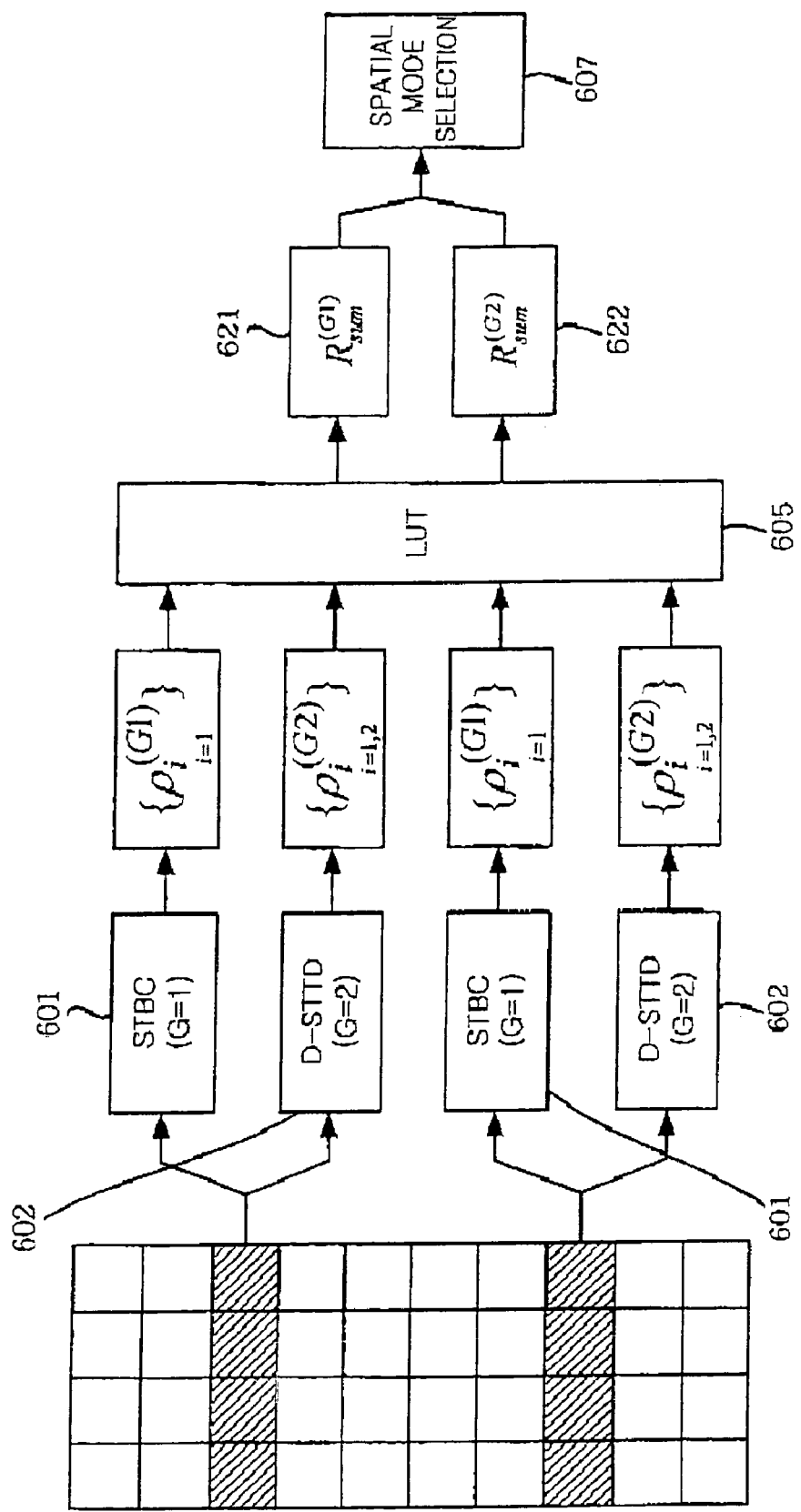
FIG. 6 is a conceptual diagram for a description of a data transmission method according to a third embodiment of the present invention.

FIG. 6 is a conceptual diagram for a description of a process of selecting one of the spatial modes with G=1 and G=2 in the frequency domain according to the third embodiment of the present invention.

The third embodiment of the present invention selects spatial subchannels for the spatial modes 601 and 602 with G=1 and G=2 for each of a predetermined number of subcarriers, selects modulation schemes for the spatial modes referring to the look-up table 605 shown in Table 1, sums up data rates, as in summation blocks 621 and 622, for the subcarriers for the same spatial modes, compares the sums of the data rates for the spatial modes, selects a spatial mode having the greater sum as in a mode selection block 607, and applies the selected mode to all of the subcarriers. In this case, however, an average of data rates in the spatial mode with G=2 is less than a saturated data rate.

Figure 7A:
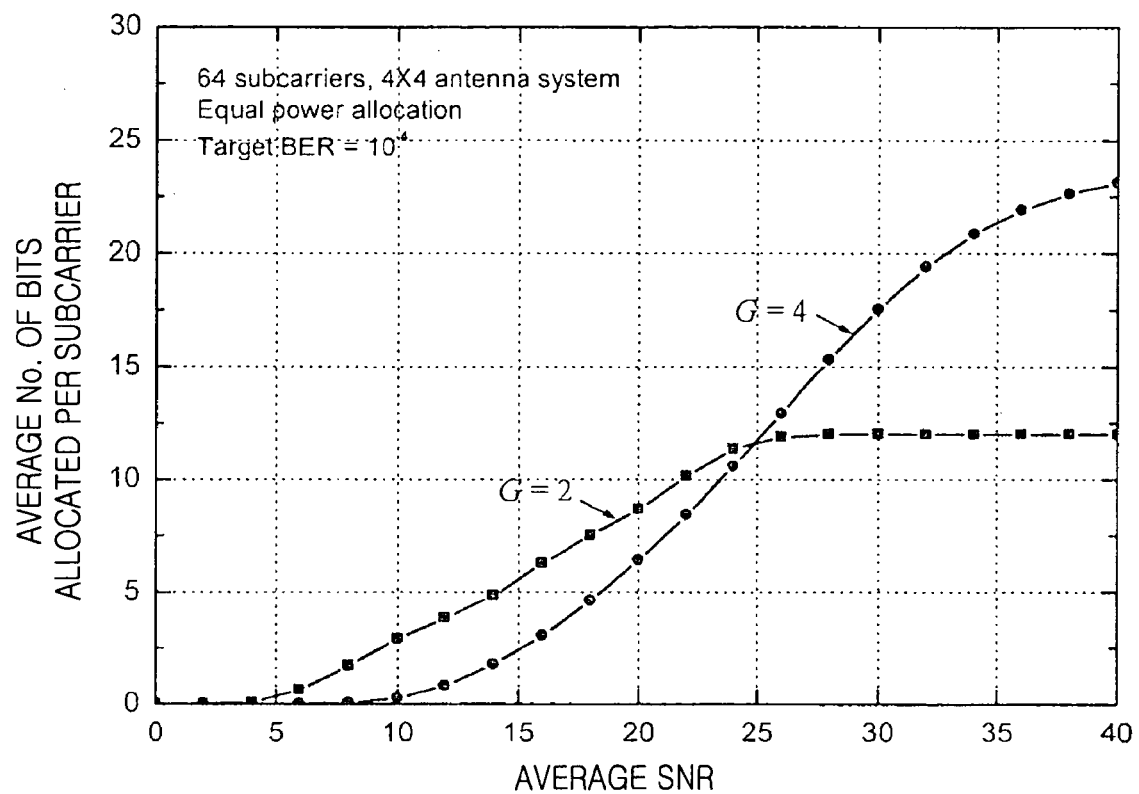
FIGS. 7A and 7B are graphs illustrating variations in the number of allocated bits and the average amount of information for an average SNR of each spatial mode in the data transmission method of the present invention.
Figure 7B:
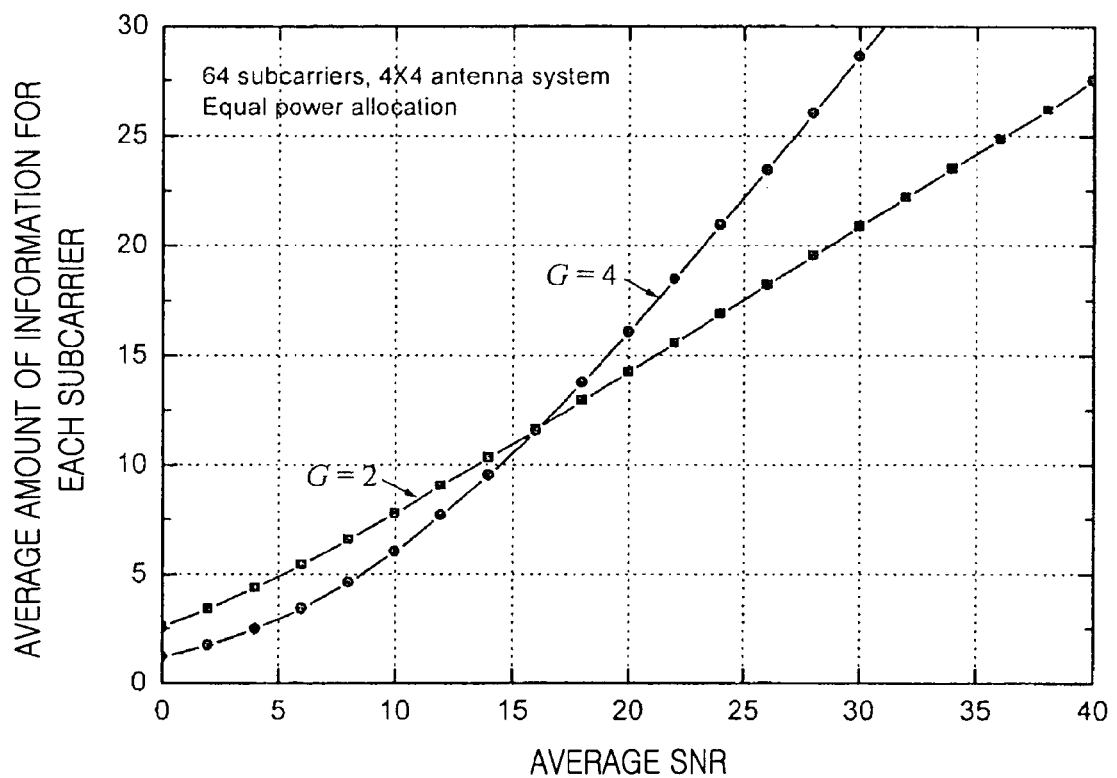

FIGS. 7A and 7B are graphs for a description of a data transmission method according to a further embodiment of the present invention. That is, a fourth embodiment of the present invention uses saturation characteristics of a data rate due to the limited modulation level.

It can be noted in FIG. 7A that the spatial mode with G=2 is greater than the spatial mode with G=4 at a low SNR in terms of the number of bits allocated per subcarrier for an average SNR, and crossover occurs at 25 dB. In addition, it can be noted in FIG. 7B that the spatial mode with G=2 is greater than the spatial mode with G=4 at a low SNR even in terms of the average amount of information for each subcarrier for an average SNR, and crossover occurs at about 15 dB.

Figure 8A:
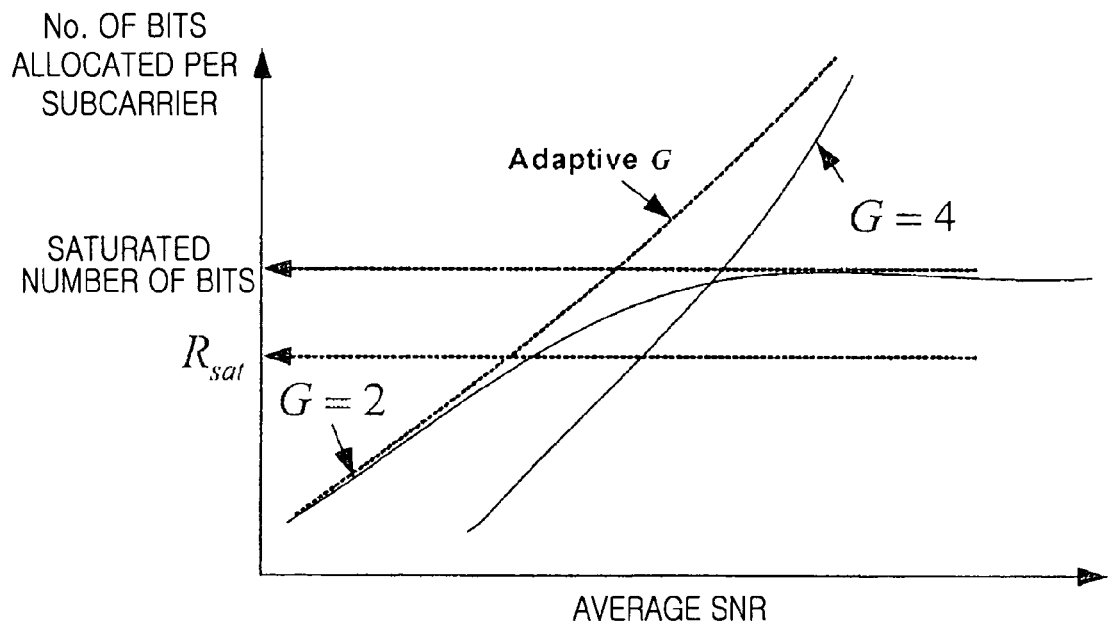
FIGS. 8A and 8B are graphs for a description of a spatial mode selection process in a data transmission method according to a fourth embodiment of the present invention.
Figure 8B:
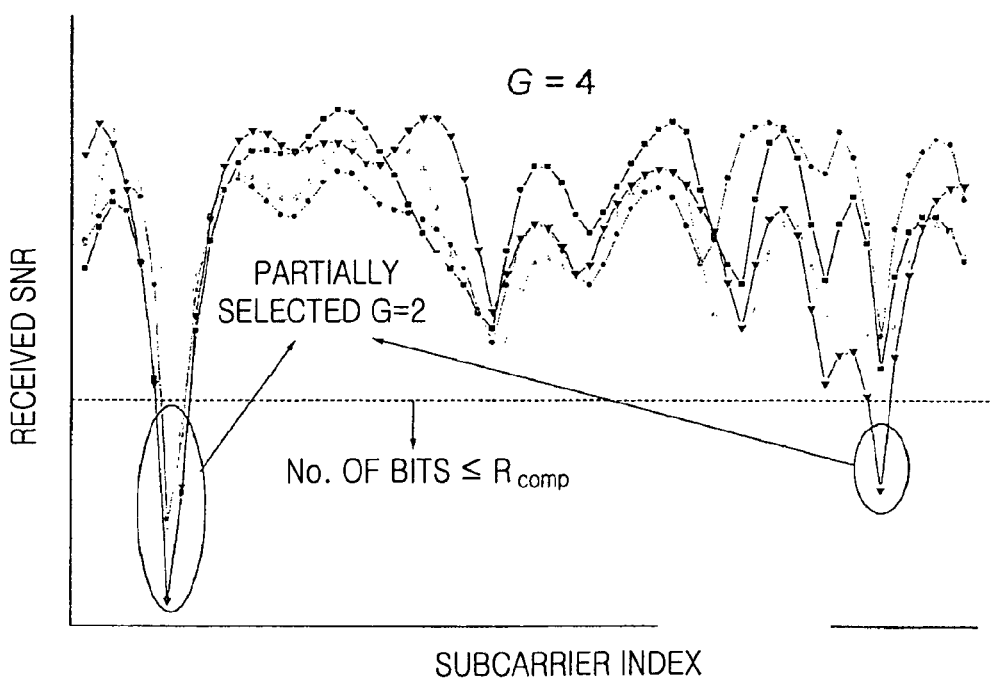

FIG. 8A is a graph for a description of a spatial mode selection process in the data transmission method according to the fourth embodiment of the present invention, and FIG. 8B is a graph for a description of spatial mode compensation for subcarriers with a low received SNR when the spatial mode with G=4 is applied.

The fourth embodiment of the present invention, as shown in FIG. 8A, applies the spatial mode with G=2 for all subcarriers if an average data rate $R_i^{(G2)}$ of the spatial mode with G=2 is lower than a saturated data rate $R_{sat}$. However, if the average data rate $R_i^{(G2)}$ of the spatial mode with G=2 is greater than or equal to the saturated data rate $R_{sat}$, this embodiment provisionally selects the spatial mode with G=4 for all subcarriers, and partially applies the spatial mode with G=2 to the subcarriers where an average of data rates $R_i^{(G4)}$ for the spatial mode with G=4 is less than or equal to a predetermined compensated data rate $R_{comp}$. The compensated data rate is determined according to a predetermined received SNR as shown in FIG. 8B.

Figure 9:
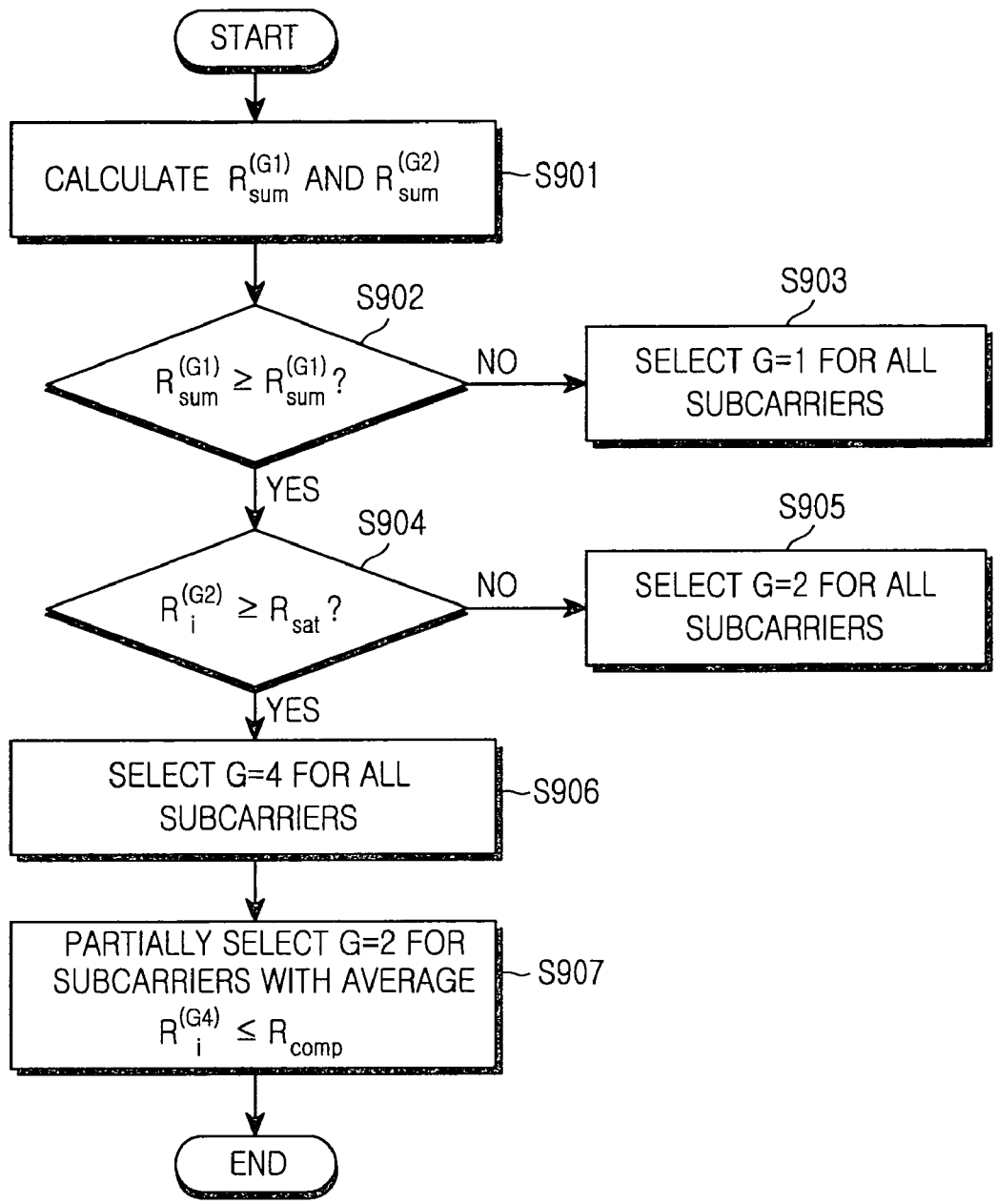
FIG. 9 is a flowchart for a description of a data transmission method according to a fifth embodiment of the present invention.

FIG. 9 is a flowchart for a description of a data transmission method according to another embodiment of the present invention. That is, a fifth embodiment of the present invention selects a spatial mode such that complexity should be minimized.

First, in step S901, a receiver calculates the total throughput and calculates data rate sums $R_{sum}^{(G1)}$ and $R_{sum}^{(G2)}$ for the case where the spatial modes with G=1 and G=2 are applied to randomly selected some subcarriers, and determines in step S902 whether $R_{sum}^{(G2)}$ is greater than or equal to $R_{sum}^{(G1)}$ (Condition 1).

If Condition 1 is not satisfied, the receiver selects the spatial mode with G=1 for all subcarriers in step S903. However, if Condition 1 is satisfied, the receiver determines in step S904 whether an average of data rates $R_i^{(G2)}$ for the spatial mode with G=2 is greater than or equal to a predetermined saturated data rate $R_{sat}$ (Condition 2).

If Condition 2 is not satisfied, the receiver selects the spatial mode with G=2 for all subcarriers in step S905. Otherwise, the receiver selects the spatial mode with G=4 for all subcarriers in step S906. After selecting the spatial mode with G=4, the receiver continues to partially select the spatial mode with G=2 for subcarriers where an average of data rates $R_i^{(G4)}$ for the spatial mode with G=4 is less than or equal to a predetermined compensated data rate $R_{comp}$ in step S907.

FIGS. 10A to 10F are graphs for a description of a data transmission method according to a further embodiment of the present invention. That is, a sixth embodiment of the present invention divides the full SNR range of subchannels into several levels, and groups the subchannels into a predetermined number of groups for adaptation. For the common allocated power applied to each group, this embodiment uses a quantized power set table predetermined through calculation for each group.

Figure 10A:
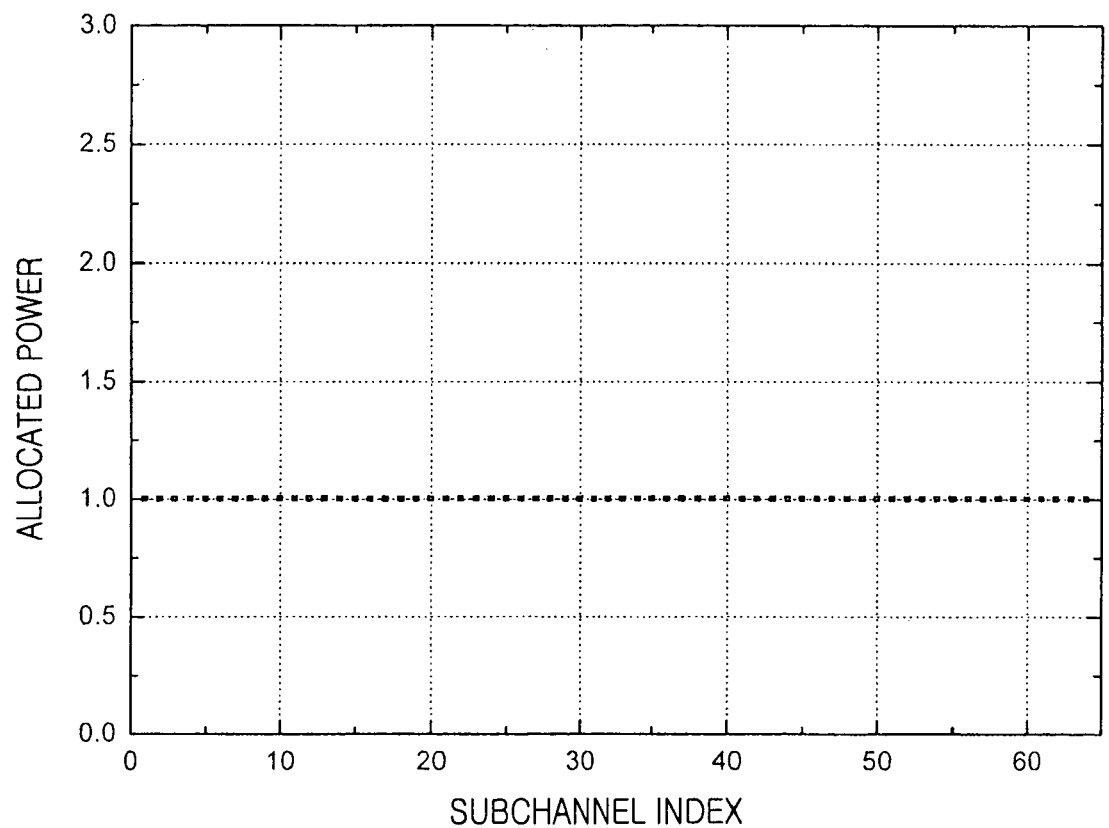
FIGS. 10A to 10F are graphs for a description of a data transmission method according to a sixth embodiment of the present invention.
Figure 10B:
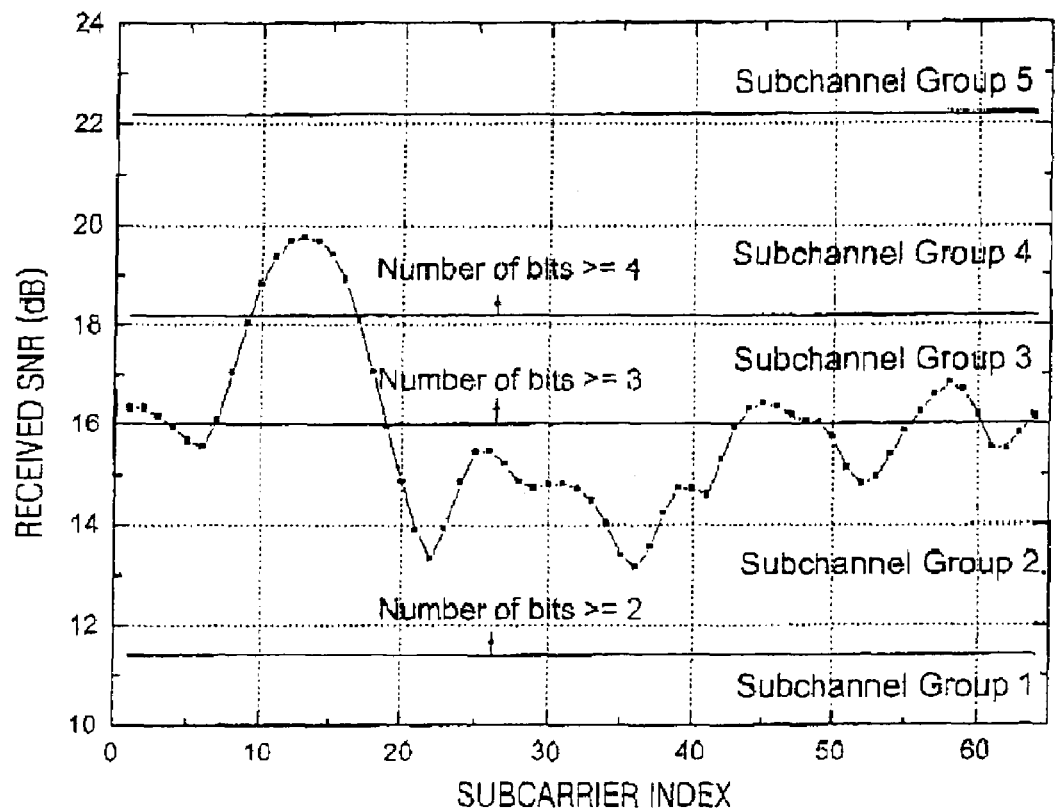

If a transmitter allocates the same power to each subchannel for initial bit allocation before transmission as shown in FIG. 10A, a receiver groups subchannels according to a received SNR corresponding to a threshold for the number of transmittable bits as shown in FIG. 10B. Herein, the term "subchannel" refers to a subchannel through which one independent data stream that may occur in the frequency domain and the spatial domain can be transmitted.

Figure 10C:
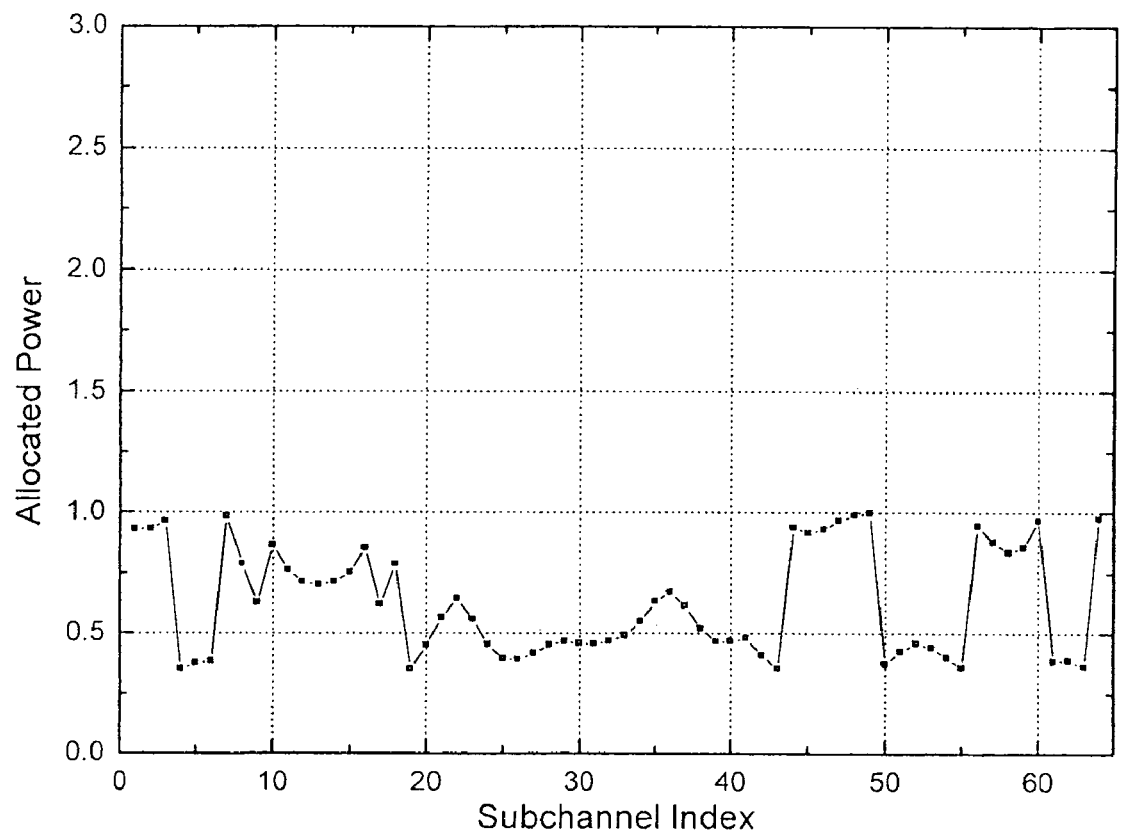
Figure 10D:
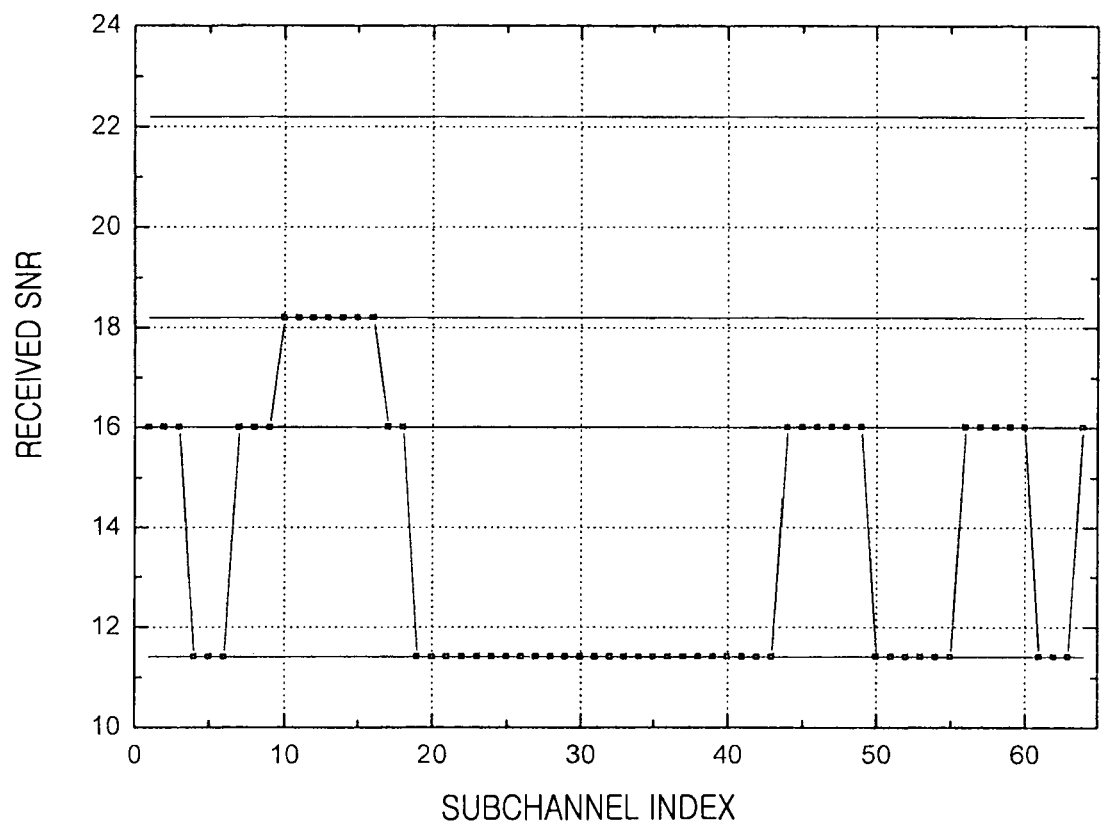

The receiver calculates the total available power by calculating extra powers except for the minimum power required for transmission of a number of initial bits allocated to each subchannel and summing the calculated extra powers, and allocates the calculated available power to each of the subcarriers (see FIG. 10C). FIG. 10D shows a received SNR when the available power is allocated to each of the subcarriers.

Figure 10E:
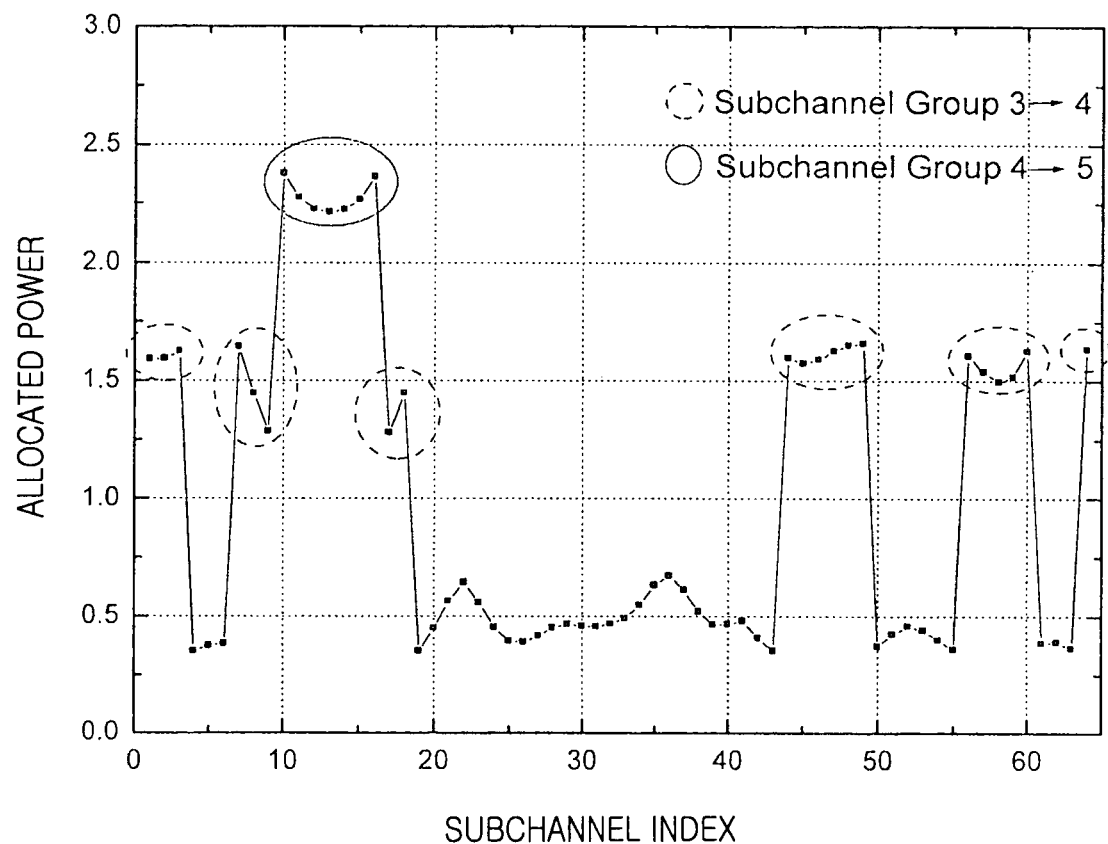
Figure 10F:
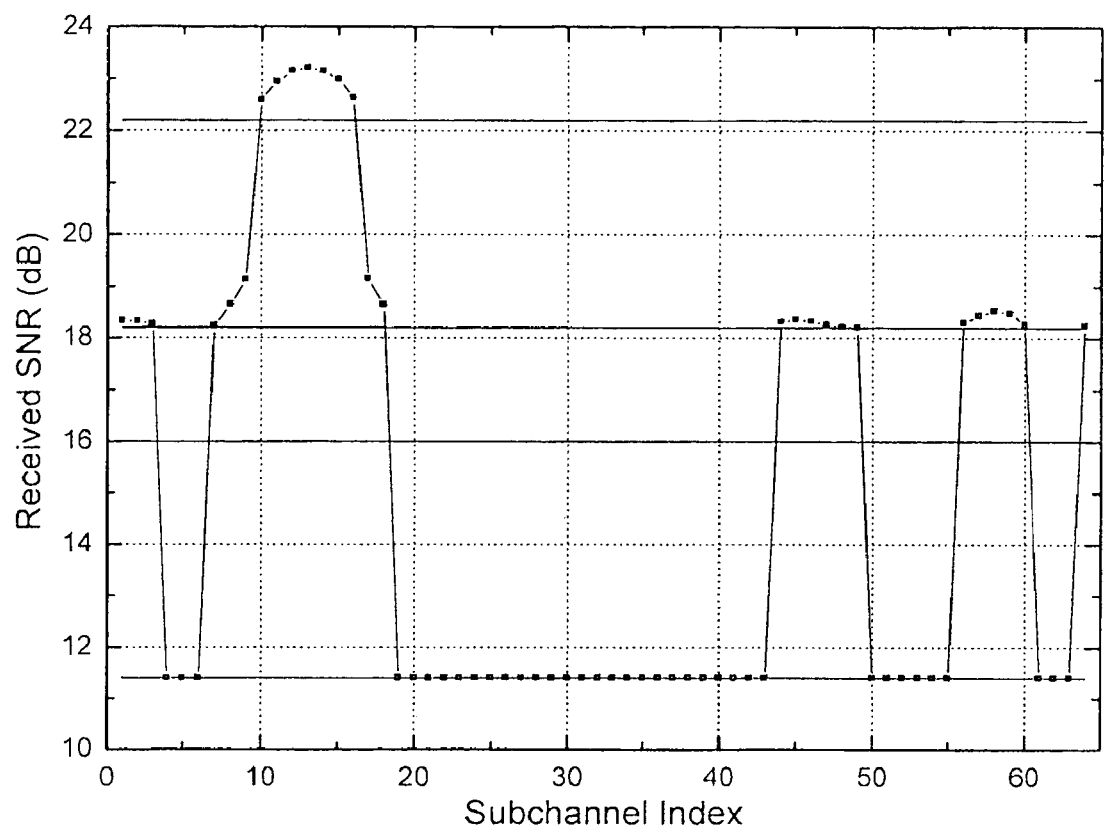

Thereafter, the receiver allocates power and a bit rate to each subchannel group using the quantized power set table predetermined through calculation for each group. FIG. 10E shows power allocated to each subcarrier for each group, and FIG. 10F shows a received SNR at this time.

In FIG. 10E, if it is assumed that power required by each subchannel is the least for allocation of a subchannel group #3 to a subchannel group #4, the power becomes equal for all subchannels belonging to group #3. That is, the power required when subchannels belonging to each group move to another group on a per-group basis are set equally, thereby reducing calculation. The equal power required for movement to group #4 starts to be allocated to each of the subchannels belonging to group #3, and if the old subchannels belonging to group #3 move to group #4, the old subchannels belonging to group #4 move to group #5 at the first step to the movement. This process is repeated until the total available power is fully allocated.

As can be understood from the foregoing description, for data transmission, the novel data transmission method appropriately changes a spatial mode in time and frequency domains according to channel environment, and appropriately adjusts a bit rate and transmission power in spatial, frequency and time domains, thereby maximizing system throughput in a given channel environment.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A data transmission method in a MIMO-OFDM (Multiple Input Multiple Output-based Orthogonal Frequency Division Multiplexing) communication system including at least one receiver for receiving a signal through a plurality of reception antennas and a transmitter for selecting a transmission channel using channel information being fed back from the receiver and transmitting a signal through a plurality of transmission antennas, the method comprising the steps of:

calculating power increments required to transmit one more bit by considering spatial modes having different multiplexing gains and spatial subchannels and subcarriers;

checking first minimum power increments corresponding to the subcarriers and the spatial modes among the power increments, and selecting spatial subchannels corresponding to the first minimum power increments;

checking second minimum power increments corresponding to the subcarriers among the first minimum power increments, and selecting spatial modes corresponding to the second minimum power increments;

checking a third minimum power increment among the second minimum power increments, and selecting a subcarrier corresponding to the third minimum power increment; and updating a power for the selected subcarrier according to the third minimum power increment and at least one bit for the selected subcarrier, for data transmission.

2. The data transmission method of claim 1, wherein each of the power increments is calculated by $$\Delta P_{j,k}^{(G)} = \left( SNR_{b_{j,k}^{(G)}-1} - SNR_{b_{j,k}^{(G)}} \right) \eta_{j,k}^{(G)} + P_k^{(G)} - P_k^{g_k}$$

where $\Delta P_{j,k}^{(G)}$ is a power increment for a subcarrier k, a spatial subchannel j, and a multiplexing gain G, $b_{j,k}^{(G)}$ is an initial bit for a subcarrier k, a spatial subchannel j, and a multiplexing gain G, $\eta_{j,k}^{(G)}$ is a noise variance for a subcarrier k, a spatial subchannel j, and a multiplexing gain G, $g_k$ is a multiplexing gain for a subcarrier k selected at a previous iteration, SNR is a signal-to-noise ratio, $P_k^{(G)}$ is a power for a subcarrier k, and a multiplexing gain G, and $P_k^{g_k}$ is a power for a subcarrier k, and a multiplexing gain $g_k$.

3. The data transmission method of claim 1, wherein each of the multiplexing gains is defined as the number of independent data streams transmitted for one symbol duration.

4. The data transmission method of claim 2, wherein each of the selected spatial subchannels is selected by $$j_k^{(G)} = \arg \min_j \left( \Delta P_{j,k}^{(G)} \right)$$

where $j_k^{(G)}$ indicates a selected spatial subchannel for a subcarrier k and a multiplexing gain G.

5. The data transmission method of claim 4, wherein each of the selected spatial modes is selected by $$G_k = \arg \min_G \Delta P_{j_k^{(G)},k}^{(G)}$$

where $G_k$ is a selected spatial mode for a subcarrier k.

6. The data transmission method of claim 5, wherein the selected subcarrier is selected by $$k' = \arg \min_k \Delta P_{j_k^{(G_k)},k}^{(G_k)}$$

where k' is a selected subcarrier.

* * * * *